US012793588B2

(12) United States Patent
Sato et al.

(10) Patent No.: US 12,793,588 B2
(45) Date of Patent: Nov. 10, 2026

(54) DEVICE AND METHOD FOR FAILURE DIAGNOSIS OF IMAGE PROCESSING DEVICES

(71) Applicant: Synaptics Incorporated, San Jose, CA (US)

(72) Inventors: Ken Sato, Kanagawa (JP); Kei Miyazawa, Tokyo (JP); Nobuhiro Nagato, Kanagawa (JP); Hikaru Shibahara, Kanagawa (JP); Sosuke Tsuji, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 170 days.

(21) Appl. No.: 18/781,058

(22) Filed: Jul. 23, 2024

(65) Prior Publication Data

US 2026/0031004 A1 Jan. 29, 2026

(51) Int. Cl.
*G09G 3/00* (2006.01)
*G09G 5/37* (2006.01)

(52) U.S. Cl.
CPC ............... *G09G 3/006* (2013.01); *G09G 5/37* (2013.01)

(58) Field of Classification Search
None
See application file for complete search history.

(56) References Cited

U.S. PATENT DOCUMENTS

2018/0074778 A1* 3/2018 Okubo .................. G06F 3/1415

* cited by examiner

*Primary Examiner* — Jas A Sanghera
(74) *Attorney, Agent, or Firm* — Leydig, Voit & Mayer, Ltd.

(57) ABSTRACT

An image processing device includes multiple image data paths of the same configuration and a test circuit. The test circuit may test the image data paths with a first setting set on each of the image data paths. The test circuit may further test the image data paths in a second state with a second setting set on each of the image data paths. The testing of the image data paths may be based on a comparison of the outputs of the image data paths. One of the image data paths processes a first image data stream with the first setting to provide a first processed image data stream to a first display device, and another of the image data paths processes a second image data stream with the second setting to provide a second processed image data stream to a second display device.

20 Claims, 5 Drawing Sheets

DEVICE AND METHOD FOR FAILURE DIAGNOSIS OF IMAGE PROCESSING DEVICES

TECHNICAL FIELD

This disclosure relates generally to image processing devices, and more particularly, to failure diagnosis of image processing devices configured to provide processed image data streams to multiple display devices.

BACKGROUND

To improve display image quality, a display system having a display device (e.g., a liquid crystal display (LCD) device, an organic light emitting diode (OLED) display device, or a micro light emitting diode (μLED) display device) may include an image processing device configured to process image data and provide the processed image data to the display device. The image processing applied to the image data may include, but is not limited to, one or more of color adjustment (e.g., color gamut adjustment), contrast enhancement, edge enhancement, demura correction, image scaling, gamma transformation, and other image processing. In one implementation, the image processing device may be implemented as or integrated into a bridge integrated circuit (IC) that interfaces a host or image source to the display device. Alternatively, the image processing device may be implemented as or integrated into a display driver IC that drives a display panel. Processing the image data depending on the system environment and/or characteristics of the display device may effectively improve the image quality on the display device, thereby providing a better user experience.

To ensure that display images are correctly displayed on display devices as intended, image processing devices may be tested for failure detection or failure diagnosis. For example, in automotive implementations, an instrument panel display system is required to reliably display safety-related information, such as vehicle speed, turn indicators, vehicle equipment warnings, monitor images, etc., on the display screen, and therefore an image processing device provided in the instrument panel display system may be tested to ensure that the image processing device normally processes image data for the display image.

SUMMARY

This summary is provided to introduce, in a simplified form, a selection of concepts that will be further described below. This summary is not necessarily intended to identify key features or essential features of the present disclosure. The present disclosure may include the following various aspects and embodiments.

In one aspect, the present disclosure provides an image processing device that includes a plurality of image data paths of the same configuration and a test circuit, wherein the plurality of image data paths include a first image data path and a second image data path. The test circuit is configured to test the plurality of image data paths in a first state in which a first setting is set on each of the plurality of image data paths. The testing of the plurality of image data paths in the first state is based on a comparison of respective outputs of the plurality of image data paths. The test circuit is further configured to test the plurality of image data paths in a second state in which a second setting is set on each of the plurality of image data paths. The testing of the plurality of image data paths in the second state is based on a comparison of respective outputs of the plurality of image data paths. The first image data path is configured to process a first image data stream with the first setting to provide a first processed image data stream to a first display device during a display operation. The second image data path is configured to process a second image data stream with the second setting to provide a second processed image data stream to a second display device during the display operation.

In another aspect, the present disclosure provides a display system that includes a plurality of display devices and an image processing device. The plurality of display devices include a first display device and a second display device. The image processing device includes a plurality of image data paths of the same configuration, wherein the plurality of image data paths includes a first image data path and a second image data path. The image processing device is configured to test the plurality of image data paths in a first state in which a first setting is set on each of the plurality of image data paths. The testing of the plurality of image data paths in the first state is based on a comparison of respective outputs of the plurality of image data paths. The image processing device is further configured to test the plurality of image data paths in a second state in which a second setting is set on each of the plurality of image data paths. The testing of the plurality of image data paths in the second state is based on a comparison of respective outputs of the plurality of image data paths. The first image data path is configured to process a first image data stream with the first setting to provide a first processed image data stream to the first display device during a display operation. The second image data path is configured to process a second image data stream with the second setting to provide a second processed image data stream to the second display device during the display operation.

In yet another aspect, the present disclosure provides a method for testing and operating an image processing device that includes a plurality of image data paths of the same configuration. The method includes first testing the plurality of image data paths in a first state in which a first setting is set on each of the plurality of image data paths. The first testing is based on a comparison of respective outputs of the plurality of image data paths. The method further includes second testing the plurality of image data paths in a second state in which a second setting is set on each of the plurality of image data paths. The second testing is based on a comparison of respective outputs of the plurality of image data paths. The method further includes processing, by a first image processing circuit of the plurality of image data paths, a first image data stream with the first setting set on the first image data path to provide a first processed image data stream to a first display device during a display operation. The method further includes processing, by a second image data path of the plurality of image data paths, a second image data stream with the second setting set on the second image data path to provide a second processed image data stream to a second display device during the display operation.

Other features and aspects are described in more detail below with reference to the attached drawings.

Figure 1:
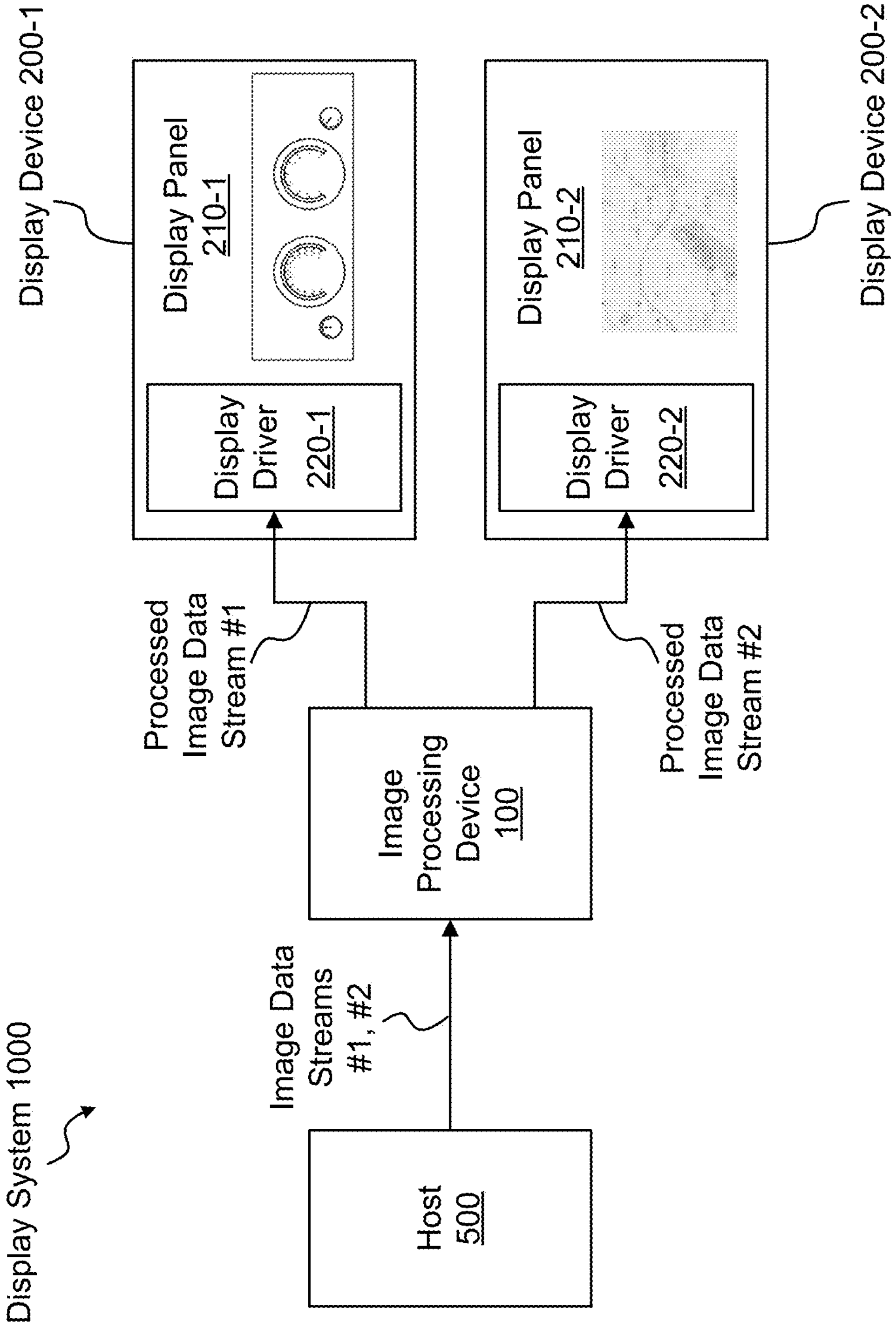
FIG. 1 shows an example configuration of a display system, according to one or more embodiments.

For ease of understanding, where possible, identical reference numerals have been used to designate elements that are common to the figures. It is contemplated that elements disclosed in one embodiment may be utilized in other embodiments without specific recitation. Suffixes may be appended to reference numerals to distinguish elements from one another. The drawings referenced herein are not to be construed as being drawn to scale unless specifically noted. In addition, the drawings are often simplified and details or components are omitted for clarity of presentation and explanation. The drawings and discussion are intended to explain principles discussed below.

DETAILED DESCRIPTION

The following detailed description is exemplary in nature and is not intended to limit the disclosure or the applications and uses of the disclosure. Further, there is no intention to be bound by any expressed or implied theory presented in the preceding background, summary and brief description of the drawings, or in the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Display systems, such as LCD systems, OLED display systems, and μLED display systems, may include image processing devices configured to process image data to improve image quality. The image processing applied to the image data may include, but is not limited to, one or more of color adjustment (e.g., white balance tuning), contrast enhancement, edge enhancement, mura correction, image scaling, gamma transformation, and other image processing. An image processing device may be implemented as or integrated into a component located between a host (e.g., an external controller such as an electronic control unit (ECU), or a processor such as an application processor, a central processing unit (CPU), or a microprocessing unit (MPU)) and a display device. For example, in some embodiments, a bridge integrated circuit (IC) providing an interface between an ECU and one or more display devices may be configured to process image data and provide the processed image data to the one or more display devices. In other embodiments, an image processing device may be implemented as or integrated into a display driver configured to drive a display panel (e.g., an LCD panel, an OLED panel, or a μLED panel) in the display device.

In some implementations, an image processing device may include multiple image data paths (or pixel data paths) configured to provide processed image data to multiple display devices, respectively. Such a configuration may be referred to as a "multi-stream transport (MST)" configuration. The term "image data path" refers to an image processing circuit configured to process an image data stream. An image data path may include one or more image processing cores, each configured to apply image processing to the image data stream. The multiple image data paths may have the same configuration, but may operate with different settings in actual display operation, depending on the display devices (e.g., their uses and/or characteristics). This scheme may effectively streamline the design, manufacturing, and test processes of the image processing device.

To ensure that display images are correctly displayed on display devices as intended, image processing devices may be tested to detect failures in their image data paths. For example, in automotive implementations, instrument panel display systems are required to reliably display safety-related information, such as vehicle speed, turn indicators, vehicle equipment alerts, monitor images, etc., on their display screens, and therefore image processing devices integrated into instrument panel display systems may be tested to detect failures in their image data paths.

Failure detection of an image data path of an image processing device may be accomplished by providing one or more test patterns (e.g., test image data) to the image data path, and comparing the outputs of the image data path for the test patterns with expected values prepared in advance of the failure detection. If one or more of the outputs of the image data path are different from the corresponding expected values, this means that the image data path contains one or more failures. In one implementation, expected values for respective test patterns may be stored in registers prepared in the image processing device.

One issue in testing the image data path is the preparation of expected values. The user of the image processing device (e.g., a display system manufacturer) may desire to adjust settings of an image data path (which may be simply referred to as "image data path settings", hereinafter) depending on the uses and/or characteristics of the corresponding display device to improve the display image quality. The image data path settings may include, but are not limited to, parameters used for image processing in the image data path, and activation or deactivation of each image processing core included in the image data path. The fact that the user may adjust the image data path settings means that there are a large number of possible image data path settings that can potentially be set for the image data path. Meanwhile, since the outputs of the image data path may vary depending on the image data path settings, the expected values used for testing may vary depending on the image data path settings. The present disclosure recognizes that it may be impractical to prepare expected values for all possible image data path settings that may be used in actual operation (e.g., during actual display operation). The vendor of the image processing device may be able to test an image data path for a limited number of image data path settings; however, this may not be sufficient to ensure reliable display operation with respect to all possible image data path settings that may be used in actual operation.

The present disclosure provides various techniques for testing image data paths of an image processing device having an MST configuration with respect to image data path settings used in actual operation. In one or more embodiments, an image processing device includes a plurality of image data paths of the same configuration and a test circuit. The plurality of image data paths includes a first image data path and a second image data path. The test circuit is configured to test the plurality of image data paths in a first state in which a first setting is set on each of the plurality of image data paths. The testing of the plurality of image data paths in the first state is based on a comparison of respective outputs of the plurality of image data paths. The test circuit is further configured to test the plurality of image data paths in a second state in which a second setting is set on each of the plurality of image data paths. The testing of the plurality of image data paths in the second state is based on a comparison of respective outputs of the plurality of image data paths. The first image data path is configured to process a first image data stream with the first setting to provide a first processed image data stream to a first display device during a display operation. The second image data path is configured to process a second image data stream with the second setting to provide a second processed image data stream to a second display device during the display operation. The image processing device thus configured is capable of testing the first image data path with the first setting and testing the second image data path with the second setting, while eliminating the need to prepare expected values for the first and second settings during testing even when the first and second settings are variously adjusted. This function of the image processing device may facilitate testing of the image data paths with respect to image data path settings used in actual operation.

FIG. 1 shows an example configuration of a display system 1000, according to one or more embodiments. The display system 1000 includes an image processing device 100, a pair of display devices 200-1 and 200-2, and a host 500. The host 500 is configured to provide image data streams #1 and #2 to the image processing device 100. The image data stream #1 corresponds to images to be displayed on the display device 200-1, and the image data stream #2 corresponds to images to be displayed on the display device 200-2. The image data stream #1 may include pixel data of pixels of the display device 200-1, and the image data stream #2 may include pixel data of pixels of the display device 200-2. The pixel data of each pixel may include greylevels of respective primitive colors (e.g., red, green, and blue) of that pixel. Examples of the host 500 include, but are not limited to, external controllers such as ECUs and processors such as application processors, CPUs, and MPUs.

The image processing device 100 is configured as a component (e.g., a bridge IC) that interfaces the host 500 with the display devices 200-1 and 200-2. In the shown embodiment, the image processing device 100 is configured to receive the image data streams #1 and #2 from the host 500 and to process the image data streams #1 and #2 to generate processed image data streams #1 and #2, respectively. The processed image data stream #1 is provided to the display device 200-1, and the processed image data stream #2 is provided to the display device 200-2.

The display device 200-1 is configured to display images based on the processed image data stream #1, and the display device 200-2 is configured to display images based on the processed image data stream #2. In the shown embodiment, the display device 200-1 includes a display panel 210-1 and a display driver 220-1, and the display device 200-2 includes a display panel 210-2 and a display driver 220-2. The display panels 210-1 and 210-2 may be any of LCD panels, OLED display panels, μLED display panels, or display panels based on other suitable display technologies. The display driver 220-1 is configured to drive the display panel 210-1 based on the processed image data stream #1, and the display driver 220-2 is configured to drive the display panel 210-2 based on the processed image data stream #2.

In some embodiments, the display devices 200-1 and 200-2 may be used to display different types of information. For example, in embodiments where the display system 1000 is used as an automotive display system, the display device 200-1 may be used as an instrument panel display that provides important vehicle information, including safety-related information, such as vehicle speed, turn indicators, vehicle equipment alerts, monitor images, etc., while the display device 200-2 may be used as a general purpose display device that may display a map and/or other entertainment content.

Figure 2:
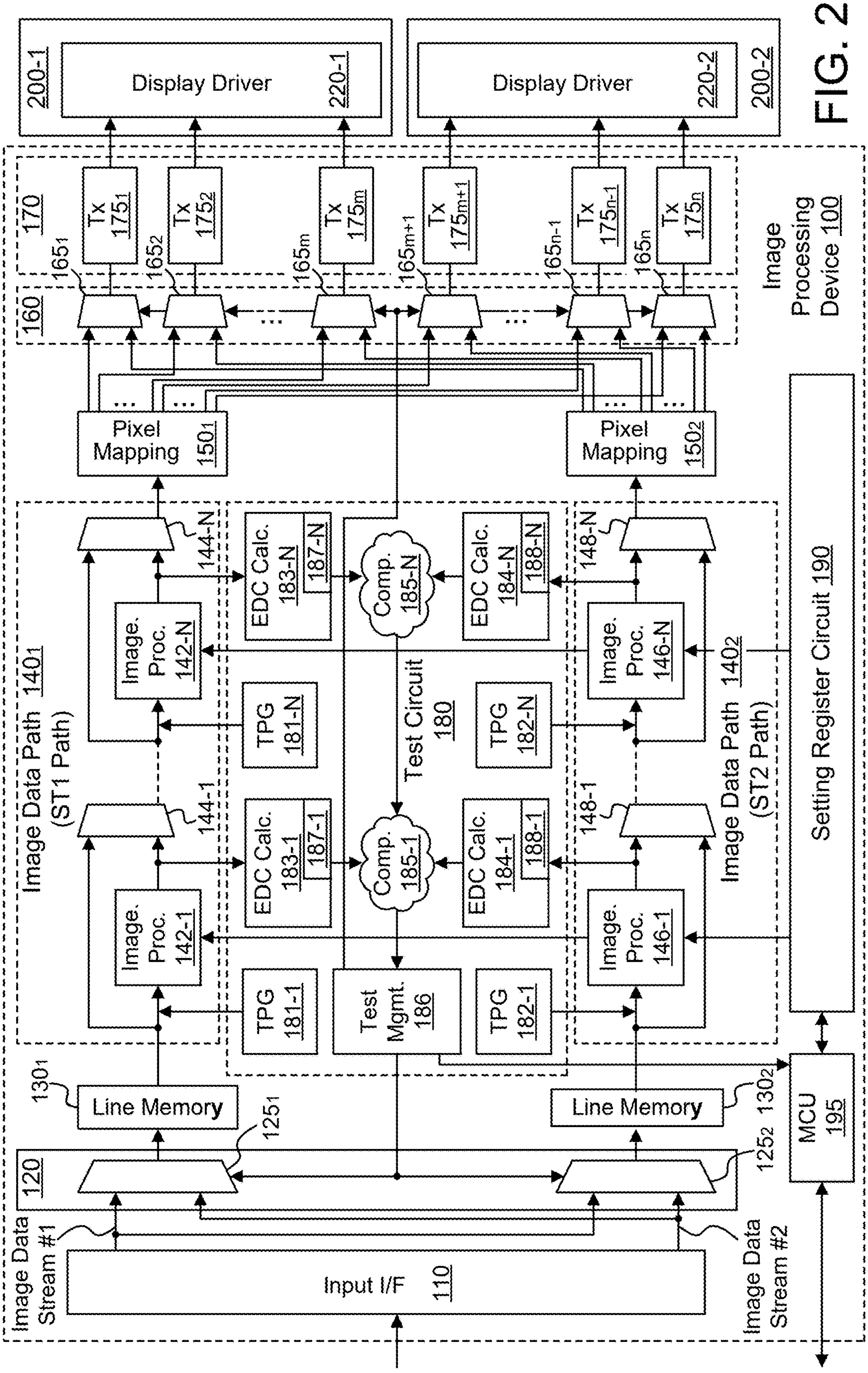
FIG. 2 shows an example configuration of an image processing device, according to one or more embodiments.

FIG. 2 shows an example configuration of the image processing device 100, according to one or more embodiments. The image processing device 100 has a "multi-stream transport (MST)" configuration with multiple image data paths of the same configuration. In the shown embodiment, the image processing device 100 includes a pair of image data paths $\mathbf{140}_1$ and $\mathbf{140}_2$ of the same configuration for processing the image data streams #1 and #2. Since the image data path $\mathbf{140}_1$ is mainly used for processing the image data stream #1, the image data path $\mathbf{140}_1$ may also be referred to as the "ST1 path". Correspondingly, the image data path $\mathbf{140}_2$ may be also referred to as the "ST2 path" since the image data path $\mathbf{140}_2$ is mainly used for processing the image data stream #2.

Since the processed image data streams #1 and #2 are provided to different display devices 200-1 and 200-2, the image data paths $\mathbf{140}_1$ and $\mathbf{140}_2$ may be set with different image data path settings depending on the destinations of the processed image data streams #1 and #2. When the image data paths $\mathbf{140}_1$ and $\mathbf{140}_2$ are used to generate and provide the processed image data streams #1 and #2 to the display devices 200-1 and 200-2, respectively, the image data path $\mathbf{140}_1$ is set with image data path settings suitable for the image display on the display device 200-1, and the image data path $\mathbf{140}_2$ is set with image data path settings suitable for the image display on the display device 200-2.

The image processing device 100 further includes an input interface (I/F) circuit 110, an input selector circuit 120, and a pair of line memories $\mathbf{130}_1$ and $\mathbf{130}_2$, which are collectively configured to forward one of the image data streams #1 and #2 to one of the image data paths $\mathbf{140}_1$ and $\mathbf{140}_2$, and the other of the image data streams #1 and #2 to the other of the image data paths $\mathbf{140}_1$ and $\mathbf{140}_2$. The input selector circuit 120 includes a pair of selectors $\mathbf{125}_1$ and $\mathbf{125}_2$ coupled to the line memories $\mathbf{130}_1$ and $\mathbf{130}_2$, respectively. The input interface circuit 110 is configured to receive the image data streams #1 and #2 from the host 500 (shown in FIG. 1) and to forward the image data streams #1 and #2 to the input selector circuit 120. The input selector circuit 120 includes a pair of selectors $\mathbf{125}_1$ and $\mathbf{125}_2$ configured to receive the image data streams #1 and #2, respectively. The selector $\mathbf{125}_1$ is configured to forward the image data stream #1 to one of the line memories $\mathbf{130}_1$ and $\mathbf{130}_2$, and the selector $\mathbf{125}_2$ is configured to forward the image data stream

#2 to the other of the line memories $130_1$ and $130_2$. The line memory $130_1$ is configured to store the input data stream received from the selector $125_1$ (the input data stream #1 or #2) and to forward the stored input data stream to the image data path $140_1$. Correspondingly, the line memory $130_2$ is configured to store the input data stream received from the selector $125_2$ (the input data stream #2 or #1) and to forward the stored input data stream to the image data path $140_2$.

As described in more detail later, the input selector circuit 120 is used to increase the operational flexibility of the image data paths $140_1$ and $140_2$ in the event of a failure in the image data path $140_1$ or $140_2$. In one or more embodiments, in normal operation during which no failure occurs in the image data paths $140_1$ and $140_2$, the input data streams #1 and #2 are provided to the image data paths $140_1$ and $140_2$, respectively, to cause the image data paths $140_1$ and $140_2$ to generate the processed image data streams #1 and #2. Further, when a fatal failure is detected in the image data path $140_1$, the input selector circuit 120 may forward one of the input data streams #1 and #2 to the image data path $140_2$ depending on the importance of the input data streams #1 and #2. In one implementation, when a fatal failure is detected in the image data path $140_1$ while the input data stream #1 carries important information (e.g., safety-related information in automotive applications), the input selector circuit 120 may forward the input data stream #1 to the image data path $140_2$ to cause the image data path $140_2$ to process the input data stream #1 and thereby generate the processed input data stream #1. Further details of the operation of the input selector circuit 120 will be described later.

The image data paths $140_1$ and $140_2$ are configured to process the image data streams received from the line memories $130_1$ and $130_2$, respectively. It is noted that the image data paths $140_1$ and $140_2$ process the image data streams #1 and #2, respectively, in normal operation during which no failure occurs in the image data paths $140_1$ and $140_2$. The image data path $140_1$ includes a chain of N image processing cores 142-1 to 142-N (two shown) and N selectors 144-1 to 144-N (two shown), while the image data path $140_2$ includes a chain of N image processing cores 146-1 to 146-N (two shown) and N selectors 148-1 to 148-N (two shown), where N is a natural number of two or more. The image processing cores 142-1 to 142-N of the image data path $140_1$ are coupled in series alternately with the selectors 144-1 to 144-N and the image processing cores 146-1 to 146-N of the image data path $140_2$ are coupled in series alternately with the selectors 148-1 to 148-N.

Each of the image processing cores 142-1 to 142-N and the image processing cores 146-1 to 146-N is configured to perform image processing on the image data stream provided thereto. The image processing performed by the image processing cores 142 and 146 may include, but is not limited to, color adjustment (e.g., color gamut adjustment), contrast enhancement, edge enhancement, demura correction, image scaling, gamma transformation, and other image processing. For any natural number i between 1 and N, inclusive, the image processing core 142-*i* of the image data path $140_1$ has the same configuration as the corresponding image processing core 146-*i* of the image data path $140_2$ to provide the same image processing.

The selectors 144-1 to 144-N are each used to bypass the corresponding image processing core 142 in the image data path $140_1$. More specifically, for each natural number i between 1 and N, inclusive, the selector 144-*i* has a pair of inputs coupled to the input and output of the image processing core 142-*i*, respectively. The selector 144-*i* is configured to select the input coupled to the output of the image processing core 142-*i* when enabling (or activating) the image processing core 142-*i*, and to select the input coupled to the input of the image processing core 142-*i* when bypassing (or deactivating) the image processing core 142-*i*.

Correspondingly, the selectors 148-1 to 148-N of the image data path $140_2$ are each used to bypass the corresponding image processing core 146 in the image data path $140_2$. The selector 148-*i* has a pair of inputs coupled to the input and output of the image processing core 146-*i*, respectively. The selector 148-*i* is configured to select the input coupled to the output of the image processing core 146-*i* when enabling (or activating) the image processing core 146-*i*, and to select the input coupled to the input of the image processing core 146-*i* when bypassing (or deactivating) the image processing core 146-*i*.

The image processing device 100 further includes a setting register circuit 190 configured to store image data path settings to be set on the image data paths $140_1$ and $140_2$. The image data path settings may include, but are not limited to, parameters used for image processing in the image processing cores 142-1 to 142-N and 146-1 to 146-N, and activation/deactivation information of each of the image processing cores 142-1 to 142-N and 146-1 to 146-N. The selector 144-*i* of the image data path $140_1$ may be configured to bypass the image processing core 142-*i* in response to the activation/deactivation information of the image processing core 142-*i* indicating that the image processing core 142-*i* should be deactivated. Correspondingly, the selector 148-*i* of the image data path $140_2$ may be configured to bypass the image processing core 146-*i* in response to the activation/deactivation information of the image processing core 146-*i* indicating that the image processing core 146-*i* should be deactivated.

When the processed image data stream generated by the image data path $140_1$ is provided to the display device 200-1, the image data path settings set on the image data path $140_1$ may be determined based on the uses and/or characteristics of the display device 200-1 to improve the display image quality of the display device 200-1. When the processed image data stream generated by the image data path $140_1$ is provided to the display device 200-2, the image data path settings set on the image data path $140_1$ may be determined based on the uses and/or characteristics of the display device 200-2 to improve the display image quality of the display device 200-2. Correspondingly, when the processed image data stream generated by the image data path $140_2$ is provided to the display device 200-1, the image data path settings set on the image data path $140_2$ may be determined based on the uses and/or characteristics of the display device 200-1 to improve the display image quality of the display device 200-1. When the processed image data stream generated by the image data path $140_2$ is provided to the display device 200-2, the image data path settings set on the image data path $140_2$ may be determined based on the uses and/or characteristics of the display device 200-2 to improve the display image quality of the display device 200-2.

The image processing device 100 further includes a pair of pixel mapping circuits $150_1$, $150_2$, an output selector circuit 160, and an output interface circuit 170, collectively configured to route each of the processed image data streams generated by the image data paths $140_1$ and $140_2$ to a desired one of the display devices 200-1 and 200-2. The output selector circuit 160 includes n selectors $165_1$ to $165_n$ and the output interface circuit 170 includes n transmitters $175_1$ to $175_n$ coupled to the selectors $165_1$ to $165_n$, respectively. The transmitters $175_1$ to $175_m$ are used for data communication with the display device 200-1 and the remaining transmitters 175$_{m+1}$ to 175$_n$ are used for data communication with the display device 200-2.

The pixel mapping circuit 150$_1$ is configured to distribute data bits of the processed image data stream output from the image data path 140$_1$ to desired ones of the selectors 165$_1$ to 165$_n$. More specifically, when the processed image data stream output from the image data path 140$_1$ is to be transmitted to the display device 200-1, the pixel mapping circuit 150$_1$ distributes data bits of the processed image data stream to the selectors 165$_1$ to 165$_m$, which are coupled to the transmitters 175$_1$ to 175$_m$, respectively. When the processed image data stream output from the image data path 140$_1$ is to be transmitted to the display device 200-2, the pixel mapping circuit 150$_1$ distributes data bits of the processed image data stream to the selectors 165$_{m+1}$ to 165$_n$, which are coupled to the transmitters 175$_{m+1}$ to 175$_n$, respectively.

Similarly, the pixel mapping circuit 150$_2$ is configured to distribute data bits of the processed image data stream output from the image data path 140$_2$ to desired ones of the selectors 165$_1$ to 165$_n$. When the processed image data stream output from the image data path 140$_2$ is to be transmitted to the display device 200-2, the pixel mapping circuit 150$_2$ distributes data bits of the processed image data stream to the selectors 165$_{m+1}$ to 165$_n$, which are coupled to the transmitters 175$_{m+1}$ to 175$_n$, respectively. When the processed image data stream output from the image data path 140$_2$ is to be transmitted to the display device 200-1, the pixel mapping circuit 150$_2$ distributes data bits of the processed image data stream to the selectors 165$_1$ to 165$_m$. which are coupled to the transmitters 175$_1$ to 175$_m$, respectively.

The output selector circuit 160 is configured to select the pixel mapping circuits 150$_1$ and 150$_2$ to be coupled to each of the transmitters 175$_1$ to 175$_n$. More specifically, the selectors 165$_1$ to 165$_m$ of the output selector circuit 160 couple the pixel mapping circuits 150$_1$ to the transmitters 175$_1$ to 175$_m$ when the processed image data stream output from the image data path 140$_1$ is to be transmitted to the display device 200-1, and couple the pixel mapping circuits 150$_2$ to the transmitters 175$_1$ to 175$_m$ when the processed image data stream output from the image data path 140$_2$ is to be transmitted to the display device 200-1. The selectors 165$_{m+1}$ to 165$_n$ couple the pixel mapping circuits 150$_1$ to the transmitters 175$_{m+1}$ to 175$_n$ when the processed image data stream output from the image data path 140$_1$ is to be transmitted to the display device 200-2, and couple the pixel mapping circuits 150$_2$ to the transmitters 175$_{m+1}$ to 175$_n$ when the processed image data stream output from the image data path 140$_2$ is to be transmitted to the display device 200-2.

The output interface circuit 170 is configured to provide data communication to the display devices 200-1 and 200-2. More specifically, the transmitters 175$_1$ to 175$_m$ of the output interface circuit 170 are configured to transmit data bits received from the selectors 165$_1$ to 165$_m$ (which may be data bits of the processed image data stream received from the image data path 140$_1$ or the image data path 140$_2$) to the display device 200-1. The transmitters 175$_{m+1}$ to 175$_n$ of the output interface circuit 170 are configured to transmit data bits received from the selectors 165$_{m+1}$ to 165$_n$ (which may be data bits of the processed image data stream received from the image data path 140$_2$ or the image data path 140$_1$) to the display device 200-2.

The image processing device 100 further includes a test circuit 180 configured to test the image data paths 140$_1$ and 140$_2$. The test circuit 180 is capable of testing the image data paths 140$_1$ and 140$_2$ without using externally provided expected values (e.g., from a tester). In one or more embodiments, the test circuit 180 may be configured to test the image data paths 140$_1$ and 140$_2$ based on a comparison of the outputs of the image data paths 140$_1$ and 140$_2$ for the same test pattern input in the state in which the same image data path settings are set on the image data paths 140$_1$ and 140$_2$. The comparison of the outputs of the image data paths 140$_1$ and 140$_2$ may be accomplished by comparing error detection codes (EDCs) calculated from the outputs of the image data paths 140$_1$ and 140$_2$. The EDCs may be cyclic redundancy check (CRC) codes or other error detection codes.

In the shown embodiment, the test circuit 180 includes test pattern generators (TPGs) 181-1 to 181-N, 182-1 to 182-N, EDC calculators 183-1 to 183-N, 184-1 to 184-N, and comparators 185-1 to 185-N. The TPGs 181-1 to 181-N may be collectively referred to as the TPGs 181, and the TPGs 182-1 to 182-N may be collectively referred to as the TPGs 182. Correspondingly, the EDC calculators 183-1 to 183-N may be collectively referred to as the EDC calculators 183, and the EDC calculators 184-1 to 184-N may be collectively referred to as the EDC calculators 184.

The TPGs 181-1 to 181-N are configured to provide test patterns (e.g. test image data) to the image processing cores 142-1 to 142-N, respectively, and the TPGs 182-1 to 182-N are configured to provide test patterns (e.g., test image data) to the image processing cores 146-1 to 146-N, respectively. The EDC calculators 183-1 to 183-N are configured to calculate error detection codes (EDCs) for the outputs of the image processing cores 142-1 to 142-N when test patterns are provided to the image processing cores 142-1 to 142-N, and the EDC calculators 184-1 to 184-N are configured to calculate EDCs for the outputs of the image processing cores 146-1 to 146-N when test patterns are provided to the image processing cores 146-1 to 146-N. The comparators 185-1 to 185-N are configured to compare between the EDCs received from the EDC calculators 183-1 to 183-N and the EDCs received from the EDC calculators 184-1 to 184-N to detect failures of the image data paths 140$_1$ and 140$_2$. The outputs of the comparators 185-1 to 185-N indicate whether there are failures in the image data paths 140$_1$ and 140$_2$. If the EDCs received from the EDC calculators 183-$i$ and 184-$i$ are different, this may indicate a failure in at least one of the image processing cores 142-$i$ and 146-$i$ of the image data paths 140$_1$ and 140$_2$.

In some embodiments, the EDC calculators 183-1 to 183-N may include EDC registers 187-1 to 187-N configured to store the EDCs calculated by the EDC calculators 183-1 to 183-N, respectively. If no failure is detected in the image data path 140$_1$ during a test process (e.g., a test process performed during a power-on sequence of the display system 1000) based on the EDCs calculated by the EDC calculators 183-1 to 183-N, the calculated EDCs may be stored in the EDC registers 187-1 to 187-N and used as expected values when another test process is later performed. Correspondingly, the EDC calculators 184-1 to 184-N may include EDC registers 188-1 to 188-N configured to store the EDCs calculated by the EDC calculators 184-1 to 184-N, respectively. The stored EDCs may be used as expected values when another test process is later performed.

The test circuit 180 further includes a test management circuit 186 configured to manage the testing of the image data path 140$_1$ and 140$_2$. The test management circuit 186 may be configured to control the TPGs 181-1 to 181-N and 182-1 to 182-N to provide test patterns to the image data path $140_1$ and $140_2$ when testing the image data path $140_1$ and $140_2$. The test management circuit 186 may be configured to detect a failure in the image data path $140_1$ and $140_2$ and/or identify a type of the failure (e.g., a non-fatal failure or a fatal failure) based on the outputs of the comparators 185-1 to 185-N, particularly, the number of comparators 185 whose outputs indicate that the EDCs input thereto are different from each other. The test management circuit 186 may be further configured to reroute the image data streams based on a fatal failure detection by controlling the input selector circuit 120 and the output selector circuit 160. For example, the test management circuit 186 may be configured to, upon detection of a fatal failure in the image data path $140_1$, cause the input selector circuit 120 to forward the image data stream #1 to the image data path $140_2$, and to cause the output selector circuit 160 to forward the processed image data stream #1 generated by the image data path $140_2$ to the display device 200-1.

The image processing device 100 further includes a microcontroller unit (MCU) 195 configured to control the overall operation of the image processing device 100, including the operation of the image data paths $140_1$ and $140_2$. More specifically, the MCU 195 may be configured to control the setting register circuit 190 to set desired image data path settings on the image data paths $140_1$ and $140_2$. The MCU 195 may be configured to update the image data path settings set on the image data paths $140_1$ and $140_2$ when appropriate or necessary. The MCU 195 may further be configured to, when a failure of the image data paths $140_1$ and $140_2$ is detected by the test management circuit 186, report the failure detection to the host 500 (shown in FIG. 1).

Figure 3:
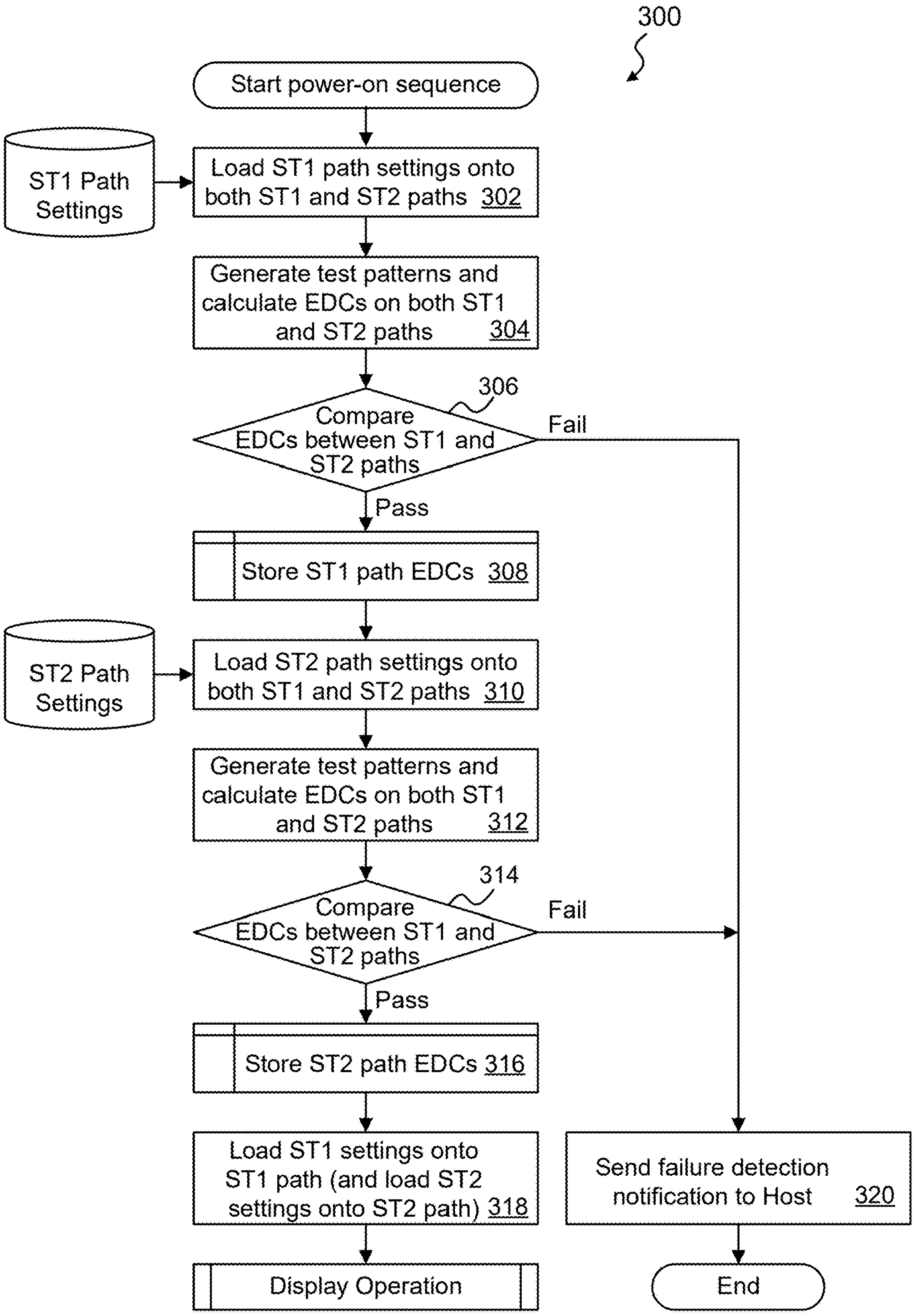
FIG. 3 is a flowchart showing an example test process, according to one or more embodiments.

FIG. 3 is a flowchart showing an example test process 300 for detecting a failure in the image data paths $140_1$ and $140_2$, according to one or more embodiments. The test process 300 may be performed during a power-on sequence of the display system 1000. While the various steps in the flowchart are shown and described sequentially, one of ordinary skill will appreciate that some or all of the steps may be performed in a different order, may be combined or omitted, and some or all of the steps may be performed. Further, additional steps may be performed. Accordingly, the scope of the disclosure should not be considered limited to the specific arrangement of steps shown in FIG. 3.

In step 302, ST1 path settings (or first settings), which are image data path settings to be set on the image data path $140_1$ during actual display operation, are loaded onto both the image data paths $140_1$ and $140_2$, which are referred to as ST1 and ST2 paths in FIG. 3. In one implementation, the ST1 path settings may be predetermined based on the uses and/or characteristics of the display device 200-1 to achieve improved image quality of the display device 200-1. The ST1 path settings may be retrieved from the setting register circuit 190 and set on both of the image data paths $140_1$ and $140_2$.

In step 304, the TPGs 181 and 182 generate and provide the same test patterns to the image data paths $140_1$ and $140_2$, and the EDC calculators 183 and 184 calculate EDCs for the test patterns from the outputs of the image data paths $140_1$ and $140_2$, respectively. More specifically, for each natural number i between 1 and N, inclusive, the TPGs 181-*i* and 182-*i* provide the same test pattern to the image processing core 142-*i* of the image data path $140_1$ and the image processing core 146-*i* of the image data path $140_2$. The EDC calculator 183-*i* calculates an EDC for the test pattern by performing EDC calculation processing on the output of the image processing core 142-*i*, and the EDC calculator 184-*i* calculates an EDC for the test pattern by performing EDC calculation processing on the output of the image processing core 146-*i*.

In step 306, the EDCs calculated in step 304 are compared between the image data paths $140_1$ and $140_2$ (between the ST1 and ST2 paths) to detect a failure in the image data paths $140_1$ and $140_2$. More specifically, each comparator 185-*i* compares the EDCs calculated by the EDC calculators 183-*i* and 184-*i* to detect a failure in the image processing cores 142-*i* and 146-*i*. In one implementation, the test management circuit 186 determines that a failure is occurring in at least one of the image processing cores 142-*i* and 146-*i* if the EDCs calculated by the EDC calculators 183-*i* and 184-*i* are different. If the test management circuit 186 does not detect a failure in the image data paths $140_1$ and $140_2$. (e.g., if the EDCs calculated by the EDC calculators 183-*i* and 184-*i* are equal for any natural numbers between 1 and N, inclusive), the process proceeds to step 308. If the test management circuit 186 detects a failure in any of the image processing cores 142 and 146 of the image data paths $140_1$ and $140_2$, the process proceeds to step 320, in which the MCU 195 sends a failure detection notification to the host 500 in response to the test management circuit 186 detecting a failure in the image data paths $140_1$ and $140_2$.

In step 308, in response to no failure being detected, the EDC calculators 183-1 to 183-N store the EDCs calculated in step 304 in the EDC registers 187-1 to 187-N, respectively. The EDCs stored in the EDC registers 187-1 to 187-N may be referred to as the ST1 path EDCs, because these EDCs are associated with the ST1 path settings. As discussed in detail later, the ST1 path EDCs stored in the EDC registers 187-1 to 187-N may be used as expected values in an in-operation test process for the image data path $140_1$.

In step 310, ST2 path settings (or second settings), which are image data path settings to be set on the image data path $140_2$ during actual display operation, are loaded onto both the image data paths $140_1$ and $140_2$. In one implementation, the ST2 path settings may be predetermined based on the uses and/or characteristics of the display device 200-2 to achieve improved image quality of the display device 200-2. The ST2 path settings may be retrieved from the setting register circuit 190 and set on both of the image data paths $140_1$ and $140_2$.

In step 312, similar to step 304, the TPGs 181 and 182 generate and provide the same test patterns to the image data paths $140_1$ and $140_2$, and the EDC calculators 183 and 184 calculate EDCs for the test patterns from the outputs of the image data paths $140_1$ and $140_2$. More specifically, the TPGs 181-*i* and 182-*i* provide the same test pattern to the image processing core 142-*i* of the image data path $140_1$ and the image processing core 146-*i* of the image data path $140_2$. The EDC calculator 183-*i* calculates an EDC for the test pattern by performing EDC calculation processing on the output of the image processing core 142-*i*, and the EDC calculator 184-*i* calculates an EDC for the test pattern by performing EDC calculation processing on the output of the image processing core 146-*i*.

In step 314, the EDCs calculated in step 312 are compared between the image data paths $140_1$ and $140_2$ (between the ST1 and ST2 paths) to detect a failure in the image data paths $140_1$ and $140_2$ in a manner similar to step 306. In one implementation, each comparator 185-*i* compares the EDCs calculated by the EDC calculators 183-*i* and 184-*i*, and the test management circuit 186 determines that a failure is occurring in at least one of the image processing cores 142-*i* and 146-*i* if the EDCs calculated by the EDC calculators 183-*i* and 184-*i* are different. If the test management circuit 186 does not detect a failure in the image data paths $140_1$ and $140_2$, the process proceeds to step 316. If the test management circuit 186 detects a failure in any of the image processing cores 142 and 146 of the image data paths $140_1$ and $140_2$, the process proceeds to step 320, in which the MCU 195 sends a failure detection notification to the host 500 in response to the test management circuit 186 detecting a failure in the image data paths $140_1$ and $140_2$.

In step 316, in response to no failure being detected, the EDC calculators 184-1 to 184-N store the EDCs calculated in step 312 in the EDC registers 188-1 to 188-N, respectively. The EDCs stored in the EDC registers 188-1 to 188-N may be referred to as the ST2 path EDCs, because these EDCs are associated with to the ST2 path settings. As discussed in detail later, the ST2 path EDCs stored in the EDC registers 188-1 to 188-N may be used as expected values in an in-operation test process for the image data path $140_2$.

In step 318, the ST1 path settings are loaded and set on the image data path $140_1$. In one implementation, the ST1 path settings may be retrieved from the setting register circuit 190 and set on the image data path $140_1$. In addition, the ST2 path settings may be loaded and set on the image data path $140_2$ as needed. By setting the ST1 path settings on the image data path $140_1$ and setting the ST2 path settings on the image data path $140_2$, the image data paths $140_1$ and $140_2$ are ready to process the image data streams #1 and #2, respectively, so that the display system 1000 is ready to begin the display operation.

Figure 4:
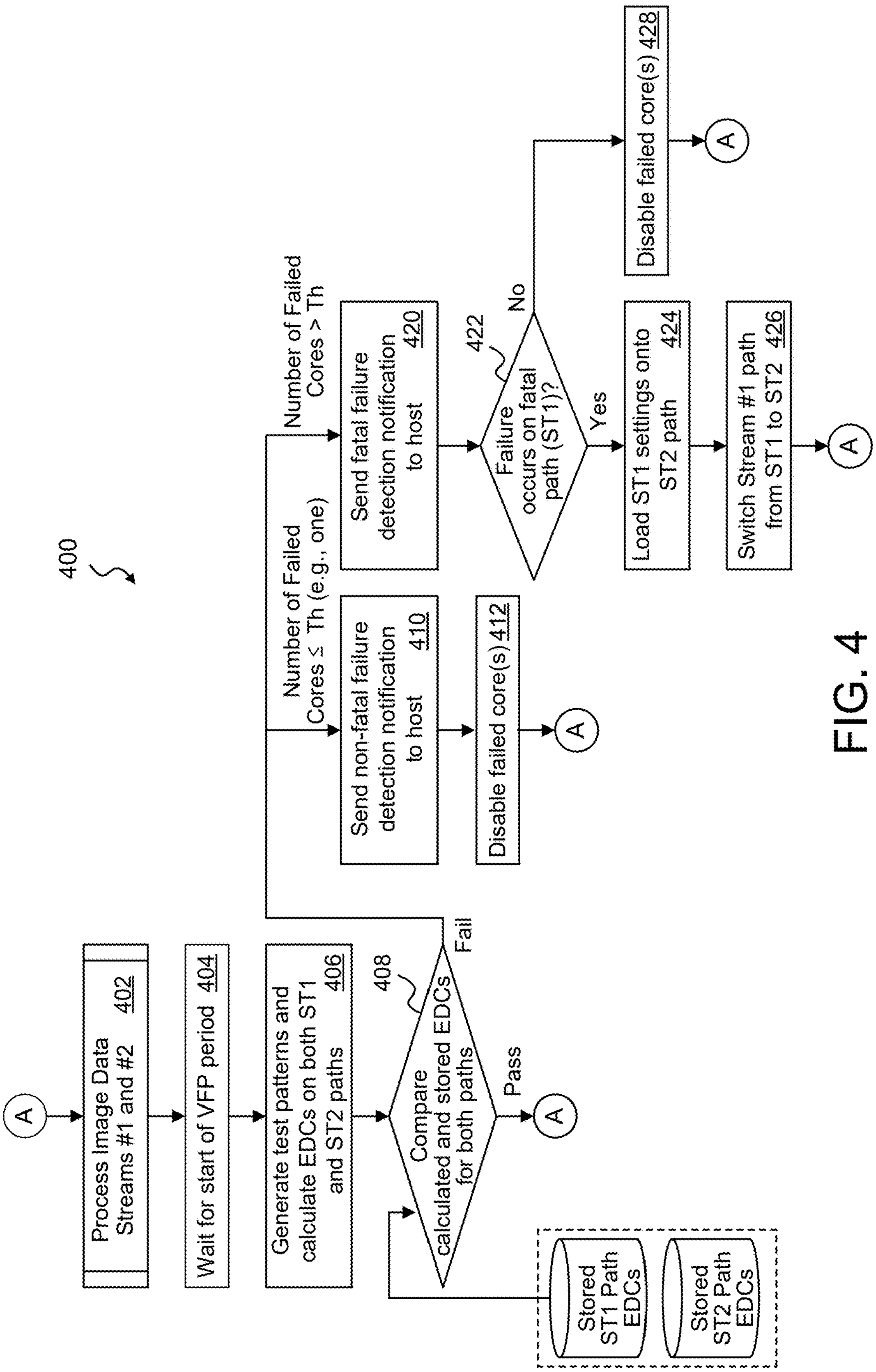
FIG. 4 is a flowchart showing an example process of a display operation of a display system, according to one or more embodiments.

FIG. 4 is a flowchart showing an example process 400 of the display operation of the display system 1000, according to one or more embodiments. While the various steps in the flowchart are presented and described sequentially, one of ordinary skill will appreciate that some or all of the steps may be performed in a different order, may be combined or omitted, and some or all of the steps may be performed in parallel. Further, additional steps may further be performed. Accordingly, the scope of the disclosure should not be considered limited to the specific arrangement of steps shown in FIG. 4.

In step 402, the image data paths $140_1$ and $140_2$ process the image data streams #1 and #2, respectively, in the state in which the ST1 path settings are set on the image data paths $140_1$ and the ST2 path settings are set on the image data paths $140_2$. The processed image data streams #1 and #2 are provided to the display devices 200-1 and 200-2, respectively, and the display drivers 220-1 and 220-2 of the display devices 200-1 and 200-2 drive or update the display panels 210-1 and 220-2 based on the processed image data streams #1 and #2, respectively. The processing of the image data streams #1 and #2 may be performed during a display update period during which the display drivers 220-1 and 220-2 update the display panels 210-1 and 220-2.

In step 404, the test circuit 180 waits for a vertical front porch (VFP) period to begin. The VFP period may be a part of a blanking period that follows the display update period. In one or more embodiments, an in-operation test process is performed in response to the start of a VFP period. Steps 406, 408, 410, 412, 420, 422, 424, 426, and 428 are steps performed during the in-operation test process.

In step 406, the TPGs 181 and 182 generate and provide test patterns to the image data paths $140_1$ and $140_2$, and the EDC calculators 183 and 184 calculate EDCs for the test patterns from the outputs of the image data paths $140_1$ and $140_2$. More specifically, for each natural number i between 1 and N, inclusive, the TPG 181-*i* provides to the image processing core 142-*i* of the image data path $140_1$ the same test pattern as the test pattern generated by the TPG 181-*i* in step 304 (shown in FIG. 3). The EDC calculator 183-*i* calculates an EDC for this test pattern by performing EDC calculation processing on the output of the image processing core 142-*i*. Meanwhile, the TPG 182-*i* provides to the image processing core 146-*i* of the image data path $140_2$ the same test pattern as the test pattern generated by the TPG 182-*i* in step 312 (shown in FIG. 3). The EDC calculator 184-*i* calculates an EDC for this test pattern by performing EDC calculation processing on the output of the image processing core 146-*i*.

In step 408, the EDCs calculated in step 406 are compared with the ST1 path EDCs and the ST2 path EDCs stored in the EDC registers 187-1 to 187-N and 188-1 to 188-N to detect a failure in the image data paths $140_1$ and $140_2$. More specifically, each comparator 185-*i* compares the EDC calculated by the EDC calculator 183-*i* in step 406 with the ST1 path EDC stored in the EDC register 187-*i* to detect a failure in the image processing core 142-*i* of the image data path $140_1$. If the EDC calculated by the EDC calculator 183-*i* in step 406 does not match the ST1 path EDC stored in the EDC register 187-*i*, this indicates a failure in the image processing core 142-*i*. Each comparator 185-*i* further compares the EDC calculated by the EDC calculator 184-*i* in step 406 with the ST2 path EDC stored in the EDC register 188-N to detect a failure in the image processing core 146-*i* of the image data path $140_2$. If the EDC calculated by the EDC calculator 184-*i* in step 406 does not match the ST2 path EDC stored in the EDC register 188-*i*, this indicates a failure in the image processing core 146-*i*. The test management circuit 186 determines, based on the outputs of the comparators 185-1 to 185-N, whether there is a failure in the image data paths $140_1$ and $140_2$. If no failure is detected in the image data paths $140_1$ and $140_2$ in step 408, the process returns to step 402.

When a failure is detected in the image data paths $140_1$ and/or $140_2$, the test management circuit 186 may perform an operation to address the detected failure depending on whether the detected failure is fatal or not. The test management circuit 186 may determine whether the detected failure is fatal or not based on the number of failed image processing cores (which may be image processing cores 142 or 146) in each of the image data paths $140_1$ and $140_2$.

When the number of failed image processing cores in each of the image data paths $140_1$ and $140_2$ is equal to or less than a predetermined number Th (e.g., one), the test management circuit 186 may determine that the detected failure is a non-fatal failure and notify the MCU 195 of the occurrence of the non-fatal failure, and the process may proceed to step 410.

In step 410, in response to the notification from the test management circuit 186, the MCU 195 may send a non-fatal failure detection notification to the host 500. Further, in step 412, the failed image processing core(s) may be deactivated. In one implementation, the failed image processing core(s) may be deactivated by causing the selector(s) 144 or 148 coupled to the output of the failed image processing core(s) to bypass the failed image processing core(s). In one implementation, the MCU 195 may update the image data path settings of the image data paths $140_1$ and/or $140_2$ to bypass the failed image processing core(s).

When the number of failed image processing cores in one or both of the image data paths $140_1$ and $140_2$ exceeds the predetermined number Th, the test management circuit 186 may determine that the detected failure is a fatal failure and notify the MCU 195 of the occurrence of the fatal failure, and the process may proceed to step 420.

In step 420, in response to the notification from the test management circuit 186, the MCU 195 may send a fatal failure detection notification to the host 500. Further, in step 422, the test management circuit 186 may determine whether the detected failure occurs on the "fatal path" which is one of the image data paths 140$_1$ and 140$_2$ assigned to process a more important one of the input data streams #1 and #2. When the input data stream #1 carries more important information than the input data stream #2, the image data path 140$_1$, which is assigned to process the input data stream #1, may be the "fatal path". More specifically, in embodiments where the display device 200-1 is used as an instrument panel display that provides important vehicle information, including safety-related information, such as vehicle speed, turn indicators, vehicle equipment warnings, monitor images, etc., the image data path 140$_1$ is the "fatal path".

When the detected failure does not occur on the fatal path (e.g., the image data path 140$_1$), the process may proceed to step 428, in which the failed image processing cores may be deactivated in step 428 by causing the selectors 144 or 148 coupled to the output of the failed image processing cores to bypass the failed image processing cores. In one implementation, the MCU 195 may update the image data path settings of the image data paths 140$_1$ and/or 140$_2$ to bypass the failed image processing cores.

When the detected failure occurs on the fatal path (e.g., the image data path 140$_1$), the process may proceed to step 424. In step 424, the ST1 path settings, which are associated with the display device 200-1, may be loaded onto the image data path 140$_2$ to allow the image data path 140$_2$ to process the image data stream #1 with the ST1 path settings. The process may then proceed to step 426, in which the image data path used to process the image data stream #1 is switched from the image data path 140$_1$ (or the ST1 path) to the image data path 140$_2$ (or the ST2 path). More specifically, the test management circuit 186 may cause the input selector circuit 120 to forward the image data stream #1 to the image data path 140$_2$ and cause the output selector circuit 160 to forward the processed image data stream #1 from the image data path 140$_2$ to the display device 200-1. After the switching, the image data path 140$_2$ may process the image data stream #1 and provide the processed image data stream #1 to the display device 200-1.

Figure 5:
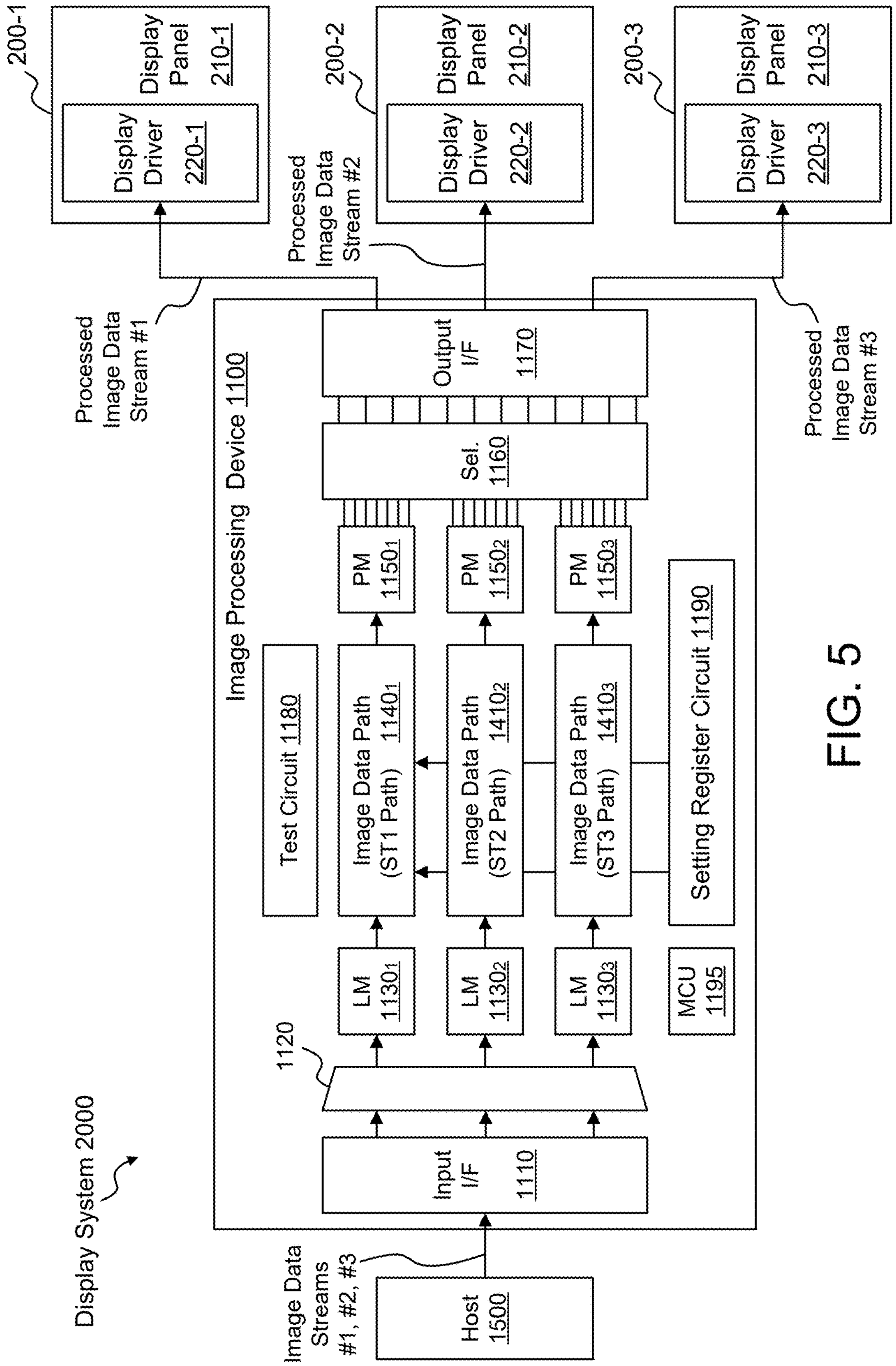
FIG. 5 shows an example configuration of a display system, according to one or more embodiments.

While the embodiments described above are based on the image processing device having two image data paths (140$_1$ and 140$_2$), the technologies disclosed in the present disclosure are applicable to image processing devices having three or more image data paths configured to provide processed image data streams to three or more display devices. FIG. 5 shows an example configuration of a display system 2000 that includes an image processing device 1100, three display devices 200-1, 200-2, 200-3, and a host 1500, according to other embodiments.

The host 1500 is configured to provide image data streams #1, #2, and #3 to the image processing device 1100, wherein the image data streams #1, #2, and #3 are associated with images to be displayed on the display devices 200-1, 200-2, and 200-3, respectively. The image data streams #1, #2, and #3 may include pixel data of pixels of the display devices 200-1. 200-2, and 200-3, respectively. Examples of the host 1500 include, but are not limited to, external controllers such as ECUs and processors such as application processors, CPUs, and MPUs.

The image processing device 1100 is configured as a component (e.g., a bridge IC) that interfaces the host 1500 with the display devices 200-1 to 200-3. In the shown embodiment, the image processing device 1100 is configured to receive the image data streams #1, #2, and #3 from the host 1500 and to process the image data streams #1, #2, and #3 to generate processed image data streams #1, #2, and #3, respectively. The processed image data streams #1, #2, and #3 are provided to the display devices 200-1, 200-2, and 200-3, respectively.

The display devices 200-1, 200-2, and 200-3 are configured to display images based on the processed image data streams #1, #2, and #3, respectively. In the shown embodiment, the display device 200-1 includes a display panel 210-1 and a display driver 220-1, the display device 200-2 includes a display panel 210-2 and a display driver 220-2, and the display device 200-3 includes a display panel 210-3 and a display driver 220-3. The display panels 210-1, 210-2, and 210-3 may be any of LCD panels, OLED display panels, μLED display panels, or display panels based on other suitable display technologies. The display driver 220-1 is configured to drive the display panel 210-1 based on the processed image data stream #1, the display driver 220-2 is configured to drive the display panel 210-2 based on the processed image data stream #2, and the display driver 220-3 is configured to drive the display panel 210-3 based on the processed image data stream #3.

The image processing device 1100 includes an input interface (I/F) circuit 1110, an input selector circuit 1120, three line memories 1130$_1$, 1130$_2$, 1130$_3$, and three image data paths 1140$_1$, 1140$_2$, and 1140$_3$. The image data paths 1140$_1$, 1140$_2$, and 1140$_3$ have the same configuration. The input interface circuit 1110 is configured to receive the image data streams #1, #2, and #3 from the host 1500. The input interface circuit 1110 is further configured to forward one of the image data streams #1, #2, and #3 to the line memory 1130$_1$, another to the line memory 1130$_2$, and the remaining one to the line memory 1130$_3$. The line memories 1130$_1$, 1130$_2$, and 1130$_3$ are configured to store the image data streams received from the input selector circuit 1120 and to provide the stored image data streams to the image data paths 1140$_1$, 1140$_2$, and 1140$_3$, respectively. The image data paths 1140$_1$, 1140$_2$, and 1140$_3$ are configured to process the image data streams received from the line memories 1130$_1$, 1130$_2$, and 1130$_3$. In one implementation, the image data paths 1140$_1$, 1140$_2$, and 1140$_3$ may each include image processing cores and selectors alternately coupled in series, similar to the image data paths 140$_1$ and 140$_2$ shown in FIG. 2.

The image processing device 1100 further includes pixel mapping circuits 1150$_1$, 1150$_2$, 1150$_3$, an output selector circuit 1160, and an output interface circuit 1170 configured similarly to the pixel mapping circuits 150$_1$, 150$_2$, the output selector circuit 160, and the output interface circuit 170 of the image processing device 100 shown in FIG. 2, respectively. The pixel mapping circuits 1150$_1$, 1150$_2$, 1150$_3$, an output selector circuit 1160, and an output interface circuit 1170 are collectively configured to forward each of the processed image data streams generated by the image data paths 1140$_1$, 1140$_2$, and 1140$_3$ to a desired one of the display devices 200-1, 200-2, and 200-3.

The image processing device 1100 further includes a test circuit 1180, a setting register circuit 1190, and an MCU 1195. The test circuit 1180 is configured to test the image data paths 1140$_1$, 1140$_2$, and 1140$_3$ in a manner similar to the test circuit 180 shown in FIG. 2. The setting register circuit 1190 is configured to store image data path settings to be set on the image data paths 1140$_1$, 1140$_2$, and 1140$_3$. The setting register circuit 1190 is configured to store image data path settings to be set on the image data paths 1140$_1$, 1140$_2$, and $1140_3$. The MCU 1195 is configured to control the overall operation of the image processing device 100, including the operation of the image data paths $1140_1$, $1140_2$, and $1140_3$. For example, the MCU 1195 may be configured to control the setting register circuit 1190 to set desired image data path settings on the image data paths $1140_1$, $1140_2$, and $1140_3$. The MCU 1195 may further be configured to update the image data path settings set on the image data paths $1140_1$, $1140_2$, and $1140_3$ as appropriate or necessary.

In one or more embodiments, a test process of the image data paths $1140_1$, $1140_2$, and $1140_3$ may be performed during a power-on sequence of the display system 2000 as follows. The test circuit 1180 may test the image data paths in a first state in which first image data path settings (or ST1 path settings) are set on each of the image data paths $1140_1$, $1140_2$, and $1140_3$. In one implementation, the first image data path settings may be data path settings to be set on the image data path $1140_1$ during actual operation (e.g., during actual display operation). The testing of the image data paths $1140_1$, $1140_2$, and $1140_3$ in the first state may be based on a comparison of the outputs of the image data paths $1140_1$, $1140_2$, and $1140_3$. In one or more embodiments, the test circuit 1180 may provide the same test patterns (e.g., the same test image data) to the image data paths $1140_1$, $1140_2$, and $1140_3$, and calculate EDCs from the outputs of the image data paths $1140_1$, $1140_2$, and $1140_3$. The test circuit 1180 may further compare the EDCs calculated from the outputs of the image data paths $1140_1$, $1140_2$, and $1140_3$ to detect a failure in the image data paths $1140_1$, $1140_2$, and $1140_3$. An inconsistency among the EDCs calculated from the outputs of the image data paths $1140_1$, $1140_2$, and $1140_3$ indicates the occurrence of a failure in the outputs of the image data paths $1140_1$, $1140_2$, and $1140_3$.

The test circuit 1180 may further test the image data paths in a second state in which second image data path settings (or ST2 path settings) are set on each of the image data paths $1140_1$, $1140_2$, and $1140_3$. In one implementation, the second image data path settings may be image data path settings to be set on the image data path $1140_2$ during actual display operation. The testing of the image data paths $1140_1$, $1140_2$, and $1140_3$ in the second state may be based on a comparison of the outputs of the image data paths $1140_1$, $1140_2$, and $1140_3$ in a manner similar to the testing of the image data paths $1140_1$, $1140_2$, and $1140_3$ in the first state.

The test circuit 1180 may further test the image data paths in a third state in which third image data path settings (or ST3 path settings) are set on each of the image data paths $1140_1$, $1140_2$, and $1140_3$. In one implementation, the third image data path settings may be image data path settings to be set on the image data path $1140_3$ in actual display operation. The testing of the image data paths $1140_1$, $1140_2$, and $1140_3$ in the third state may be based on a comparison of respective outputs of the image data paths $1140_1$, $1140_2$, and $1140_3$ in a manner similar to the testing of the image data paths $1140_1$, $1140_2$, and $1140_3$ in the first and second states.

During actual display operation, the image data paths $1140_1$, $1140_2$, and $1140_3$ may be operated with the first, second, and third image data path settings, respectively. The image data path $1140_1$ may process the image data stream #1 using the first image data path settings to provide the processed image data stream #1 to the display device 200-1, the image data path $1140_2$ may process the image data stream #2 using the second image data path settings to provide the processed image data stream #2 to the display device 200-2, and the image data path $1140_3$ may process the image data stream #3 using the third image data path settings to provide the processed image data stream #3 to the display device 200-3.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or unless otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While exemplary embodiments have been described herein, variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An image processing device, comprising:

a plurality of image data paths of the same configuration, wherein the plurality of image data paths comprise a first image data path and a second image data path; and a test circuit configured to:

test the plurality of image data paths in a first state in which a first setting is set on each of the plurality of image data paths, wherein the testing of the plurality of image data paths in the first state is based on a comparison of respective outputs of the plurality of image data paths; and test the plurality of image data paths in a second state in which a second setting is set on each of the plurality of image data paths, wherein the testing of the plurality of image data paths in the second state is based on a comparison of respective outputs of the plurality of image data paths, wherein the first image data path is configured to process a first image data stream with the first setting to provide a first processed image data stream to a first display device during a display operation; and wherein the second image data path is configured to process a second image data stream with the second setting to provide a second processed image data stream to a second display device during the display operation.

2. The image processing device of claim 1, wherein the testing of the plurality of image data paths in the first state comprises:

calculating a plurality of error detection codes (EDCs) based on the respective outputs of the plurality of image data paths in the first state, respectively; and testing the plurality of image data paths based on a comparison of the plurality of EDCs.

3. The image processing device of claim 2, wherein the testing of the plurality of image data paths in the first state and the testing of the plurality of image data paths in the second state are performed during a power-on sequence.

4. The image processing device of claim 2, wherein the test circuit is further configured to:

store a first EDC of the plurality of EDCs, wherein the first EDC is calculated based on a first output of the first image data path in the first state;

calculate a second EDC based on a second output of the first image data path during the display operation; and test the first image data path during the display operation based on a comparison between the first EDC and the second EDC.

5. The image processing device of claim 4, wherein the test circuit is further configured to:

in response to detecting a first failure in the first image data path during the testing of the first image data path during the display operation, cause the second image data path to process a subsequent image data stream with the first setting to produce a subsequent processed image data stream, and to provide the subsequent processed image data stream to the first display device.

6. The image processing device of claim 5, wherein the first failure in the first image data path is detected based on a number of failed image processing cores of the first image data path exceeding a predetermined number.

7. The image processing device of claim 4, wherein the test circuit is further configured to disable one or more failed cores of the first image data path in response to detecting a second failure in the first image data path during the testing of the first image data path during the display operation.

8. The image processing device of claim 7, wherein the second failure in the first image data path is detected based on a number of failed image processing cores of the first image data path being equal to or less than a predetermined number.

9. The image processing device of claim 1, wherein the image processing device is configured as a bridge integrated circuit (IC) configured to provide the first processed image data stream to the first display device and provide the second processed image data stream to the second display device.

10. A display system, comprising:

a plurality of display devices comprising a first display device and a second display device; and an image processing device comprising a plurality of image data paths of the same configuration, wherein the plurality of image data paths comprise a first image data path and a second image data path, wherein the image processing device is configured to:

test the plurality of image data paths in a first state in which a first setting is set on each of the plurality of image data paths, wherein the testing of the plurality of image data paths in the first state is based on a comparison of respective outputs of the plurality of image data paths; and test the plurality of image data paths in a second state in which a second setting is set on each of the plurality of image data paths, wherein the testing of the plurality of image data paths in the second state is based on a comparison of respective outputs of the plurality of image data paths, wherein the first image data path is configured to process a first image data stream with the first setting to provide a first processed image data stream to the first display device during a display operation; and wherein the second image data path is configured to process a second image data stream with the second setting to provide a second processed image data stream to the second display device during the display operation.

11. The display system of claim 10, wherein the testing of the plurality of image data paths in the first state comprises:

calculating a plurality of error detection codes (EDCs) based on the respective outputs of the plurality of image data paths in the first state, respectively; and testing the plurality of image data paths based on a comparison of the plurality of EDCs.

12. The display system of claim 11, wherein the testing of the plurality of image data paths in the first state and the testing of the plurality of image data paths in the second state are performed during a power-on sequence.

13. The display system of claim 11, wherein the image processing device is further configured to:

store a first EDC of the plurality of EDCs, wherein the first EDC is calculated based on a first output of the first image data path in the first state;

calculate a second EDC based on a second output of the first image data path during the display operation; and test the first image data path during the display operation based on a comparison between the first EDC and the second EDC.

14. A method, comprising:

first testing a plurality of image data paths of the same configuration in a first state in which a first setting is set on each of the plurality of image data paths, wherein the first testing is based on a comparison of respective outputs of the plurality of image data paths;

second testing the plurality of image data paths in a second state in which a second setting is set on each of the plurality of image data paths, wherein the second testing is based on a comparison of respective outputs of the plurality of image data paths;

processing, by a first image data path of the plurality of image data paths, a first image data stream with the first setting set on the first image data path to provide a first processed image data stream to a first display device during a display operation; and processing, by a second image data path of the plurality of image data paths, a second image data stream with the second setting set on the second image data path to provide a second processed image data stream to a second display device during the display operation.

15. The method of claim 14, wherein the first testing comprises:

calculating a plurality of error detection codes (EDCs) based on the respective outputs of the plurality of image data paths in the first state, respectively, wherein the first testing is based on a comparison of the plurality of EDCs.

16. The method of claim 15, wherein the first testing and the second testing are performed during a power-on sequence.

17. The method of claim 15, further comprising:

storing a first EDC of the plurality of EDCs, wherein the first EDC is calculated based on a first output of the first image data path in the first state;

calculating a second EDC based on a second output of the first image data path during the display operation; and third testing the first image data path during the display operation based on a comparison between the first EDC and the second EDC.

18. The method of claim 17, further comprising:

in response to detecting a first failure in the first image data path during the third testing, processing, by the second image data path, a subsequent image data stream with the first setting set on the second image data path to produce a subsequent processed image data stream; and providing the subsequent processed image data stream to the first display device.

19. The method of claim 18, wherein the first failure in the first image data path is detected based on a number of failed image processing cores of the first image data path exceeding a predetermined number.

20. The method of claim 17, further comprising:

in response to detecting a second failure in the first image data path during the third testing, disabling one or more failed cores of the first image data path.

* * * * *